United States Patent [19]
Yokoyama et al.

[11] Patent Number: 5,487,903
[45] Date of Patent: Jan. 30, 1996

[54] METHOD FOR IMPROVING THE QUALITIES OF MEAT AND MEAT PIECE TREATED THEREBY

[75] Inventors: Takaaki Yokoyama; Hirotaka Sasaki; Yumiko Ohno, all of Ibaraki; Kentaro Nakajima, Chiba; Yasuhiro Miura; Hideki Mori, both of Ibaraki, all of Japan

[73] Assignee: Kao Corporation, Tokyo, Japan

[21] Appl. No.: 358,308

[22] Filed: Dec. 19, 1994

[30] Foreign Application Priority Data

Dec. 17, 1993 [JP] Japan .................................. 5-343815
Jan. 18, 1994 [JP] Japan .................................. 6-017932

[51] Int. Cl.$^6$ .................................................. A23L 1/318
[52] U.S. Cl. .......................... 426/56; 426/641; 426/611; 426/652
[58] Field of Search ............................ 426/56, 92, 331, 426/335, 532, 566, 652, 641, 55, 611

[56] References Cited

U.S. PATENT DOCUMENTS 2,418,914  4/1947  Tichy .
2,767,096  10/1956  Schotte .
4,710,228  12/1987  Seaborne et al. .

OTHER PUBLICATIONS

Database WPI, Derwent Publications Ltd., AN 93 330553, JP-A-05 236 919, Sep. 17, 1993.
Database WPI, Derwent Publications Ltd., AN 84 261042, JP-A-59 160 523, Sep. 11, 1984.
Food Technology, vol. 21, Nov. 1967, Gerald T. Luce, "Acetylated Monoglycerides As Coatings For Selected Foods", pp. 48–49, 82 and 84.
Database WPI, Derwent Publications Ltd., AN 84–097624, JP-A-59 042 853, Mar. 9, 1984.

*Primary Examiner*—Carolyn Paden
*Attorney, Agent, or Firm*—Oblon, Spivak, McClelland, Maier & Neustadt

[57] ABSTRACT

A method for improving the qualities of meat which comprises treating a meat piece with an ester represented by the following formula (1):

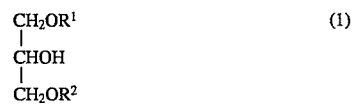

wherein one of $R^1$ and $R^2$ represents a saturated or unsaturated monocarboxylic acid residue having 2 to 24 carbon atoms while the other represents a dicarboxylic acid residue;

a meat piece which has been treated by this method, and a composition comprising the ester and a protease are disclosed. By treating a meat (for example, cattle meat, fowl meat) in accordance with the method of the present invention, a meat piece having a tender texture and a high juiciness can be obtained, in particular, in the case of a meat piece of a certain size or larger or minced meat.

22 Claims, No Drawings

METHOD FOR IMPROVING THE QUALITIES OF MEAT AND MEAT PIECE TREATED THEREBY

FIELD OF THE INVENTION

This invention relates to a method for improving the qualities of meat and a meat piece which has been treated by this method. More particularly, it relates to a method for improving the qualities of meat whereby a meat having a tender texture and being highly juicy and having a good flavor even after cooking (for example, grilling, frying) can be provided and a meat piece which has been treated by this method.

BACKGROUND OF THE INVENTION

There are a number of meat dishes which are prepared by using meat pieces of a certain size cut off from cattle meats (for example, beef, pork) or fowl meats (for example, chicken, duck) or molded materials (for example, hamburger steak) comprising minced meat obtained from these meats as the main component together with vegetables and seasonings. In the case of these dishes, it is desirable that the meat is eaten in a state of having an appropriate tenderness and being rich in meat juice (i.e., being highly juicy) containing the taste components, regardless of the cooking procedure, e.g., grilling (for example, grilling over an open fire, baking in a casserole or grilling on a cooking plate such as a frying pan), frying or deep frying. In the case of a steak or a cutlet prepared from not a molded material but a meat piece of a large size, the tenderness and the juiciness are important factors for providing a delicious meat product. In the case of a molded material such as a hamburger steak, it is desirable that the product is eaten in a state of having a fluffy and smooth texture. However, such a meat piece or a molded material comprising minced meat as the main component as the one described above is generally tend to become hard and tough when heated. It also has a tendency to lose the meat juice. Furthermore, a meat with poor qualities becomes not only hard but also sinewy and thus suffers from a serious deterioration in the texture. Accordingly, it has been required to develop a method for improving the qualities of a meat which makes it possible to provide a tender and delicious meat product having a good texture even by using such a meat of poor qualities as the one described above.

Some methods have been proposed to improve the qualities of meat (for example, tenderizing the meat or improving the keeping qualities thereof). For example, JP-A-49-20353 (the term "JP-A" as used herein means an "unexamined published Japanese patent application) discloses a method wherein an organic acid monoglyceride (for example, acetylated monoglyceride) is used. Further, JP-A-4-278063 discloses a method wherein protease is used.

Another methods have also been proposed with aiming at obtaining fluffy and/or highly juicy molded product comprising minced meat as the main component. For example, JP-A-1-228427 discloses a method wherein an edible fat and oil, a natural wax and a surfactant for edible use are added to meat. Further, JP-A-5-176721 discloses a method wherein an oil-in-water-in-oil type emulsion is added meat.

However, none of these method can achieve any satisfactory improvement.

SUMMARY OF THE INVENTION

It is an object of the present invention to provide a method for improving the qualities of meat whereby meat having a tender texture and being highly juicy even after being cooked by heating can be provided.

It is another object of the present invention to provide a meat piece which has been treated by the method of the above-mentioned characteristics, is easy to eat, has a good flavor and can be eaten after cooking by a simple procedure.

The present inventors have found that a specific ester is particularly effective in, for example, tenderizing meat and that a meat piece having a tender texture and being highly juicy can be obtained by treating meat with such a specific ester, thus completing the present invention.

Accordingly, the present invention provides a method for improving the qualities of meat which comprises treating a meat piece with an ester represented by the following formula (1):

wherein one of $R^1$ and $R^2$ represents a saturated or unsaturated monocarboxylic acid residue having 2 to 24 carbon atoms while the other represents a dicarboxylic acid residue.

The present invention further provides a meat piece which has been treated by the above-mentioned method.

The present invention furthermore provides an agent for improving the qualities of meat which comprises the above-mentioned ester and a protease.

DETAILED DESCRIPTION OF THE INVENTION

The term "meat piece" as used herein means a meat piece of a certain size or larger which has been cut off from, for example, a cattle meat and subjected to cooking as such (for example, one having a surface area of 1 cm$^2$ or above) or minced meat thereof. The term "meat" as used herein means such a meat piece per se or a molded material prepared by using minced meat obtained from such a meat as the main component optionally together with vegetables and/or seasonings (for example, hamburger steak).

Meat pieces, in particular, cattle and fowl meat pieces contain a relatively large amount of hard proteins (collagen) including tendons. When such a meat piece is cooked by heating, these tendons contract and cohere, which seemingly makes the meat tough and hard. It is considered that in the presence of the specific ester to be used in the present invention, the contraction of these proteins is suppressed and, as a result, a tender meat can be obtained.

In the above formula (1), one of $R^1$ and $R^2$ represents a saturated or unsaturated monocarboxylic acid residue having from 2 to 24, preferably from 8 to 22 and still preferably from 12 to 18, carbon atoms. Specific examples of the monocarboxylic acid include hydroxymonocarboxylic acids such as gluconic acid and lactic acid; saturated fatty acids such as acetic acid, propionic acid, butyric acid, valeric acid, hexanoic acid, octanoic acid, decanoic acid, lauric acid, myristic acid, palmitic acid, stearic acid, arachidic acid and behenic acid; and unsaturated fatty acids such as palmitoleic acid, oleic acid, elaidic acid, linoleic acid, linolenic acid and erucic acid. Among these acids, gluconic acid, lactic acid, stearic acid and oleic acid are particularly preferred.

Another one of $R^1$ and $R^2$ represents a dicarboxylic acid residue. Examples of the dicarboxylic acid include saturated dicarboxylic acids such as oxalic acid, malonic acid, succinic acid, glutaric acid, adipic acid, pimelic acid, suberic acid and azelaic acid; unsaturated dicarboxylic acids such as maleic acid, methylmaleic acid, fumaric acid and methylfumaric acid; hydroxydicarboxylic acids such as malic acid and tartaric acid; hydroxydicarboxylic acids wherein some or all of hydroxyl groups thereof have been esterified with monocarboxylic acid(s) having from 2 to 24 carbon atoms, the above-mentioned saturated dicarboxylic acid(s), the above-mentioned unsaturated hydroxycarboxylic acid(s) or the above-mentioned hydroxydicarboxylic acid(s) (for example diacetyltartaric acid); and anhydrides thereof. Among the above-mentioned saturated dicarboxylic acids, succinic acid, diacetyltartaric acid and malic acid are a particularly preferable one.

In the ester of formula (1) (Ester (1)), a carboxyl group which does not participate in the bonding may either remain as such or form a salt. As examples of a counter ion for the formation of such a salt, potassium, sodium, calcium and magnesium ions may be cited.

It is to be understood that, in the context of the present invention, the term carboxylic residue refers to the group obtained when the —OH portion is removed from the carboxylic functional group of a carboxylic acid. For example, the residue of acetic acid is $CH_3C(=O)$—. Thus, the compounds of formula (1) are diglycerides in which one of the ester groups is an ester of a monocarboxylic acid, and the other ester group is an ester of a dicarboxylic acid.

Ester (1) can be synthesized in accordance with a conventional method by using publicly known starting materials. It is preferable that monoglyceride of a monocarboxylic acid having from 2 to 24 carbon atoms is reacted with a dicarboxylic acid thereby to give an ester (Ester (1)). For example, an ester of a fatty acid monoglyceride mainly composed of $C_{18}$ fatty acid with succinic acid (i.e., succinylated monoglyceride) can be prepared by heating the fatty acid monoglyceride mainly composed of $C_{18}$ fatty acid to 90° C., slowly adding thereto an equimolar amount of succinic anhydride, stirring the resulting mixture, lowering the reaction temperature to 75° C. and then adding potassium carbonate thereto (hydroxyl value: 150). In the case of such a reaction, the target product is usually obtained in the form of a mixture with a small amount of by-products depending on the molar ratio of the monoglyceride to the dicarboxylic acid and the type of the fatty acid residues. Such a mixture is also usable in the present invention without purification.

Ester (1) may be used as such. Alternatively, it can be used in the form of, for example, a solution, a slurry, a powder, a solution or dispersion in a fat or oil, one being adsorbed by a carrier such as dextrin, or a capsule, depending on the form of the meat piece to be treated therewith and the cooking procedure. In particular, it may be blended with arbitrary components (for example, starches, proteins, sugars, fats, oils, seasonings) and used in the form of a mixture. Examples of such a mixture are as follows: (1) a powdery base to be blended with karaage-ko (a batter mix), powdery seasonings, etc.; (2) a cooking oil to be blended with soybean oil, corn oil, etc.; (3) a plastic fat to be blended with refined lard, shortening, etc.; (4) a W/O emulsion to be blended with margarine, etc.; (5) an O/W emulsion; and (6) a liquid seasoning to be blended with soup stock, sauce, etc.

The method for improving the qualities of meat according to the present invention comprises treating a meat piece with Ester (1) or a mixture containing Ester (1). It is preferable to use Ester (1) in an amount of from 0.05 to 5 % by weight (more preferably from 0.1 to 3% by weight and still preferably from 0.3 to 2% by weight) based on the weight of the meat. This treatment is performed by contacting the meat piece with Ester (1) or a mixture containing Ester (1). The contact of the meat piece with Ester (1) or a mixture containing Ester (1) may be made by application, sprinkling, spraying or injection. Alternatively, it may be made by soaking the meat piece in Ester (1) or a mixture containing Ester (1). Injection of Ester (1) or a mixture containing Ester (1) into the meat piece may be carried out by either automatically or manually with the use of, for example, a syringe or an injector.

The treatment of the meat piece with Ester (1) or a mixture containing Ester (1) may be effected either before or during the cooking process, though Ester (1) should co-exist with the meat piece when the meat piece is cooked by heating.

The period of time for treating the meat piece with Ester (1) or a mixture containing Ester (1) is not particularly restricted. Although the meat piece may be cooked by heating immediately after the application, sprinkling, spraying or injection, it is preferable to appropriately select the treating time by taking the size and thickness of the meat piece into consideration.

The treating temperature is not particularly restricted too. Although the treatment is usually effected at room temperature, a chilled or frozen meat piece may be treated with Ester (1) or a mixture containing Ester (1).

In the method for improving the qualities of meat according to the present invention, a protease may be used together with Ester (1). The coexistence of the protease with Ester (1) makes it possible to give a meat having an improved texture. This is seemingly because Ester (1) suppresses the contraction of proteins contained in the meat and the protease decomposes binding tissues contained therein at the same time. When the protease is used together with Ester (1), the treating time and the treating temperature may not be particularly restricted but arbitrarily selected, so long as the activity of the protease is not inhibited thereby.

An amount of the protease to be used together with Ester (1) is preferably from 0.001 to 5% by weight (more preferably from 0.005 to 3% by weight and still preferably from 0.01 to 1% by weight) based on the weight of the meat. It is preferable that the ratio of the protease to Ester (1) falls within a range of from 10:1 to 1:10 (more preferably from 1:10 to 2:1).

A composition comprising Ester (1) and a protease is also one embodiment of the present invention and it can be used as an agent for improving the qualities of meat.

In the agent for improving the qualities of meat according to the present invention, Ester (1) and a protease are preferably contained in a weight ratio of the protease to Ester (1) of from 10:1 to 1:10 (more preferably from 1:10 to 2:1). The agent for improving the qualities of meat according to the present invention may be used in any of the forms set forth above and may be blended with any of the arbitrary components set forth above.

The agent for improving the qualities of meat according to the present invention may be used in the manner set forth above in relation to the method for improving the qualities of meat according to the present invention.

The method for improving the qualities of meat of the present invention is highly effective when applied to the cooking of cattle meats such as beef, pork and mutton and fowl meats such as chicken, turkey, duck and goose. Regarding the meat site, the method of invention is effective in the treatment of sites being rich in relatively high proteins (collagen) such as shoulder and round meats (or ham or dark meat). Regarding the form of the meat, the method of the present invention is effective in treating both of meat pieces (thick slices, thin slices, fine pieces) and molded materials consisting mainly of minced meat, as described above, though it is particularly effective in treating meat pieces of a certain size (meat pieces for steak, yakiniku (grilled meat), karaage (deep fried meat after being coated with a batter mix), cutlet, teriyaki (broiled meat after being soaked in a sauce), etc.).

The method for improving the qualities of meat according to the present invention exerts its effect in case where the meat piece is cooked by heating. Although this effect can be achieved regardless of the cooking procedures (grilling, frying, deep frying, boiling, steaming, etc.), a remarkable effect can be obtained, in particular, in the case of grilling or frying (including deep frying). Examples of meat dishes to which the method of the present invention is applicable and in which a meat piece is served as such include yakiniku, meat grilled on skewers, steak, cutlet, karaage, roast beef, roast chicken, curry, hash, stew, shabu-shabu (meat slices cooked in boiling broth with vegetables) and subuta (fried pork with sweet and sour taste). On the other hand, examples of meat dishes to which the method of the present invention is applicable and in which a molded material mainly composed of minced meat is used include hamburger steak, meat ball, meat loaf, fried cake of minced meat, gyoza, shao-mai, won ton, harumaki (fried, steamed or boiled dumplings stuffed with minced meat), meat bun and meat sauce.

The method for improving the qualities of meat of the present invention can be further applied to frozen foods, chilled foods and foods which can be stored at room temperature (for example, retort foods) each containing meat pieces. These foods may be either one which has been already cooked by heating (i.e., a heated prepared food) or one which is to be cooked by heating prior to serving (i.e., an unheated prepared food). Namely, in the case of the heated prepared food, the method the present invention may be applied in the heating step of the preparation. On the other hand, the unheated prepared food may be made to contain preliminarily Ester (1) via, for example, addition or adsorption, thereby the method of the present invention is applied in the heating step prior to serving.

A meat product containing meat pieces, which have been treated by the method of the present invention, sustains the tenderness and juiciness of the meat and shows an excellent flavor even though it is cooked by heating after being stored in a refrigerated or frozen state. A molded material mainly composed of minced meat, which have been treated by the method of the present invention, has also a tender and fluffy meat texture, sustains a high juiciness and shows an excellent flavor even though it is cooked by heating after being stored in a frozen or refrigerated state.

Furthermore, even when a meat is cooked by heating without being treated by the method of the present invention, the effect of the present invention can be exerted by applying the method of the present invention to the cooked meat when it is heated again.

Now Composition Examples and Application Examples wherein Ester (1) is contained will be given. As Ester (1) in the Composition Examples and the Application Examples, succinylated monoglyceride (an ester obtained by reacting a fatty acid monoglyceride mainly composed of $C_{18}$ fatty acid with succinic acid at an equimolar ratio) may be used typically, but an ester obtained by using diacetyltartaric acid in place of the succinic acid may also be used. Each composition ratio is expressed in parts by weight.

COMPOSITION EXAMPLE 1

| Component | Amount (part by weight) |
| --- | --- |
| Wheat flour (soft) | 55 |
| Corn starch | 10 |
| Powdery sugar | 3.5 |
| Common salt | 11 |
| Skim milk | 2 |
| Powdery soy sauce | 5 |
| Sodium glutamate | 2.5 |
| Spice powder | 1 |
| Ester (1) | 10 |
| Total | 100 |

APPLICATION EXAMPLE:

50 g of chicken is coated with 5 to 10 g of the karaage-ko and then deeply fried.

In the above-mentioned cooking process, the content of Ester (1) preferably ranges from 0.25 to 50% by weight (more preferably from 0.5 to 30% by weight).

COMPOSITION EXAMPLE 2

| Component | Amount (part by weight) |
| --- | --- |
| Corn salad oil | 95 |
| Ester (1) | 5 |
| Total | 100 |

APPLICATION EXAMPLE:

10 to 25 g of the cooking oil is introduced into a frying pan and heated. Then 100 g of fine pieces of raw meat are fried in the oil.

In the above-mentioned cooking process, the content of Ester (1) preferably ranges from 0.2 to 50% by weight (more preferably from 0.4 to 30% by weight).

COMPOSITION EXAMPLE 3

| Component | Amount (part by weight) |
| --- | --- |
| Hydrogenated soybean oil (m.p.: 34° C.) | 40 |
| Palm oil | 15 |
| Soybean oil | 20 |
| Ester (1) | 20 |
| Garlic powder | 2 |
| Pepper powder | 2 |
| Onion oil | 1 |
| Total | 100 |

APPLICATION EXAMPLE:

20 to 40 g of the plastic fat is introduced into a frying pan and molten by heating. Then 200 g of raw meat for steak is grilled therein.

In the above-mentioned cooking process, the content of Ester (1) preferably ranges from 0.25 to 50% by weight (more preferably from 0.5 to 30% by weight).

COMPOSITION EXAMPLE 4

| Component | Amount (part by weight) |
| --- | --- |
| Soy sauce | 27 |
| Sugar | 21 |
| Mirin (sweetened sake seasoning) | 18 |
| Starch syrup | 7 |
| Common salt | 4.5 |
| Sodium glutamate | 2 |
| Beef extract | 2 |
| Spice | 3 |
| Apple juice (5-fold concentrate) | 5 |
| Xanthan gum | 0.5 |
| Ester (1) | 10 |
| Total | 100 |

APPLICATION EXAMPLE:

50 g of a raw meat slice for yakiniku is dressed with 5 to 15 g of the sauce as specified above and then grilled on a hot-plate.

In the above-mentioned sauce, the content of Ester (1) preferably ranges from 0.2 to 50% by weight (more preferably from 0.4 to 30% by weight).

To illustrate the present invention in greater detail, the following Examples and Comparative Examples will be given.

EXAMPLE 1

About 0.25 g of powders of an ester obtained by reacting a fatty acid monoglyceride composed of $C_{16-18}$ (mainly $C_{18}$) saturated fatty acid with succinic acid at an equimolar ratio (Step SS, manufactured by Kao Corporation) was sprinkled onto both faces of 50 g of a sliced raw beef round made in Australia having a thickness of 5 mm. Then the right side and the reverse side of the beef slice were grilled on a hot plate at 200° C. each for 1 minute.

COMPARATIVE EXAMPLE 1

A raw meat was grilled in the same manner as in Example 1 except for using no Ester 1.

EXAMPLE 2

A sliced beef round was grilled in the same manner as in Example 1.

COMPARATIVE EXAMPLE 2

The procedure of the above Example 2 was repeated except for using an acetylated monoglyceride (an ester obtained by acetylating a monoglyceride of fatty acids mainly composed of $C_{18}$ fatty acid; CETODAN, tradename, a product of GRINDSTED) and soaking the beef slice in the acetylated monoglyceride in the form of a liquid followed by the elimination of the excessive acetylated monoglyceride through drainage for 2 to 3 minutes.

EXAMPLE 3

Appropriate amounts of common salt and pepper were sprinkled onto 150 g of a sliced raw beef loin having a thickness of 2 cm, made in Australia. Then about 1 g of a powder of an ester obtained by reacting a fatty acid monoglyceride composed of a $C_{16-18}$ (mainly $C_{18}$) saturated fatty acid with diacetyltartaric acid at an equimolar ratio (Sunsoft No. 641D, manufactured by Taiyo Kagaku K.K.) was uniformly sprinkled onto both faces of the beef slice. Immediately thereafter, the right side and the reverse side of the beef slice were grilled on a hot plate at 200° C. each for 2 minutes and 30 seconds.

COMPARATIVE EXAMPLE 3

A beef slice was grilled in the same manner as in Example 3 except for using no Ester 1.

EXAMPLE 4

Appropriate amounts of common salt and pepper were sprinkled onto a raw pork loin slice (100 g) having a thickness of 1 cm, made in Japan. Then, about 2 g of the powder of the ester as employed in Example 1 was uniformly sprinkled onto both faces of the pork slice. Thereafter, the pork slice was coated successively with wheat flour, liquid egg and bread crumbs and fried in salad oil heated to 180° C. for 3 minutes and 30 seconds.

COMPARATIVE EXAMPLE 4

A pork slice was fried in the same manner as in Example 4 except for using no Ester 1.

EXAMPLE 5

A raw chicken thigh with bone was cut into chunks each weighing about 50 g and seasoned by sprinkling soy sauce, sake and pepper thereonto. Thereafter, 1 g of the powder of the ester as employed in Example 3 was sprinkled on the chunks, and then these chunks were coated successively with liquid egg and wheat flour and fried in salad oil heated to 160° C. for 3 minutes.

COMPARATIVE EXAMPLE 5

Chicken chunks were fried in the same manner as in Example 5 except for using no Ester 1.

EXAMPLE 6

200 ml of 5-fold concentrated kombu (sea tangle) soup stock and 10 g of the ester employed in Example 1 were added to 800 ml of water and boiled. Then, 10 g of a raw beef slice for shabu-shabu was dipped into the boiling soup for 5 seconds.

COMPARATIVE EXAMPLE 6

A beef slice was boiled in the same manner as in Example 6 except for using no Ester 1.

EXAMPLE 7

Appropriate amounts of Common salt and pepper were sprinkled onto 100 g of a raw pork loin slice having a thickness of 1 cm, made in Japan. Then, about 2 g of the powder of the ester employed in Example 1 (Step SS, manufactured by Kao Corporation) was uniformly sprinkled onto both faces of the pork slice. Then the pork slice was coated successively with wheat flour, liquid egg and bread crumbs and fried in salad oil heated to 180° C. for 3 minutes and 30 seconds.

The pork loin cutlet thus prepared was cooled and stored in a refrigerator at −20° C. for 1 week. Subsequently, it was thawed at room temperature and reheated in a toaster oven.

COMPARATIVE EXAMPLE 7

A pork slice was fried, refrigerated and reheated in the same manner as in Example 7 except for using no Ester 1.

EXAMPLE 8

Appropriate amount of common salt and pepper were sprinkled onto 100 g of a raw pork loin slice having a thickness of 1 cm, made in Japan. Then, about 2 g of the powder of the ester employed in Example 1 was uniformly sprinkled onto the surface of the pork slice. Thereafter, the pork slice was coated successively with wheat flour, liquid egg and bread crumbs and stored in a refrigerator at −20° C. for 1 week.

Following the storage, the coated pork loin slice was fried as such in a salad oil at 180° C. for 4 minutes.

COMPARATIVE EXAMPLE 8

A pork slice was coated, refrigerated and fried in the same manner as in Example 8 except for using no Ester 1.
(Evaluation)

Each meat dish thus prepared was organoleptically evaluated by 20 panelists. The evaluation was made in the following manner. Namely, the meat dish obtained in each Example was compared with the one of the corresponding Comparative Example in "tenderness" and "juiciness". Then, the product of the Example was evaluated in 3 grades, i.e., "clearly tenderer (or juicier)", "somewhat tenderer (or juicier)" or "equivocal", in comparison with the one of the corresponding Comparative Example. Further, the shear force value (i.e., shear stress) of the meat of each meat dish was measured with a meat shear (manufactured by WARNER-BRATZLER, U.S.A.). A smaller shear force value means a tenderer meat.

Tables 1-1 and 1-2 summarize the results.

TABLE 1-1

|  | Example 1 | Example 2 | Example 3 | Example 4 | Example 5 | Example 6 | Example 7 | Example 8 |
|---|---|---|---|---|---|---|---|---|
| Clearly tenderer | 11 | 10 | 12 | 3 | 12 | 15 | 8 | 14 |
| Somewhat tenderer | 9 | 10 | 8 | 17 | 8 | 5 | 12 | 6 |
| Equivocal | 0 | 0 | 0 | 0 | 0 | 0 | 0 | 0 |
| Clearly juicier | 17 | 15 | 9 | 10 | 11 | 8 | 15 | 12 |
| Somewhat juicier | 3 | 5 | 11 | 10 | 9 | 9 | 5 | 8 |
| Equivocal | 0 | 0 | 0 | 0 | 0 | 3 | 0 | 0 |

TABLE 1-2

| Example No. | 1 | 2 | 3 | 4 | 5 | 6 | 7 | 8 |
|---|---|---|---|---|---|---|---|---|
| Shear force value (kg) | 2.0 | 2.0 | 2.9 | 2.1 | 2.5 | 0.4 | 2.3 | 2.2 |
| Comparative Example No. | 1 | 2 | 3 | 4 | 5 | 6 | 7 | 8 |
| Shear force value (kg) | 3.5 | 3.4 | 4.8 | 2.9 | 5.2 | 0.9 | 3.4 | 3.1 |

As the results given in the above Table 1-1 clearly show, the meat dishes to which the method of the present invention had been applied (Examples 1 to 8) were superior in tenderness and juiciness to the corresponding ones to which the method of the present invention had not been applied (Comparative Examples 1 to 8). Also the shear force values shown in Table 1-2 clearly show that meats were tenderized by applying the method of the present invention thereto. Furthermore, a meat product containing a meat piece which had been cooked by heating with the application of the method of the present invention and then stored in a refrigerator (i.e., Example 7) or a meat product containing a meat piece which had been treated with the application of the method of the present .invention, stored in a refrigerator and then reheated before eating (i.e., Example 8) showed a tender and juicy meat texture, which indicates that the effect of the present invention had been sustained in these cases.

Similar results could be obtained when diacetyltartaric acid was used in place of the succinic acid, or succinic acid was used in place of the diacetyltartaric acid, for obtaining the esters in these Examples.

EXAMPLE 9

To 35.0 parts by weight of rapeseed oil was added 10.0 parts by weight of the ester employed in the above Example 1 under stirring at 60° C. and dissolved thereby to give an oily phase. On the other hand, 0.2 part by weight of sucrose stearic acid ester (HLB: 11) was dissolved in 54.8 parts by weight of water thereby to give an aqueous phase. Then, the oily phase was dropped into the aqueous phase under stirring at 10,000 rpm with the use of a homomixer. After the completion of the addition of the oily phase, the mixture was further stirred in the homomixer at 10,000 rpm for 5 minutes. Then the obtained mixture was passed through a homogenizer under 100/0 kgf/cm$^2$ (primary/secondary pressures, the same will apply hereinafter) to thereby give an O/W emulsion composition.

The composition thus obtained was injected to ten spots of a raw beef round block made in Australia with a syringe so as to make 100 g of the composition was injected to 1 kg of the meat (i.e., 1% of by weight of the ester, based on the meat). The meat block thus treated was sliced into pieces of 5 mm in thickness and grilled on a hot plate at 200° C.

EXAMPLE 10

The right side and the reverse side of a raw beef round slice made in Australia (50 g) of 5 mm in thickness were grilled on a hot plate at 200° C. each for 1 minute. Then the meat was stored in a refrigerator at −20° C. After 1 week, about 0.25 g of the ester employed in Example 1 was sprinkled onto both faces of the meat slice and then the right side .and the reverse side of the meat slice were grilled again on a hot plate at 200° C. each for 30 seconds.

EXAMPLE 11

About 0.25 g Of a powder of an ester obtained by reacting a fatty acid monoglyceride composed of $C_{16-18}$ (mainly $C_{18}$) fatty acid with malic acid at an equimolar ratio (Sunsoft No. 601B, manufactured by Taiyo Kagaku K.K.) was uniformly sprinkled onto both faces of a beef round slice (50 g) of 5 mm in thickness made in Australia. Then, the right side and the reverse side of the beef slice were grilled on a hot plate at 200° C. each for 1 minute.

EXAMPLE 12

Onto a pork loin slice (100 g) of 1 cm in thickness made in Japan, 1.5 g of a mixture of the ester employed in Example 1 with a preparation of a protease originating from Aspergillus (Sumizyme, manufactured by Shin Nippon Kagaku Kogyo K.K. (enzyme content: 23%)) at a weight ratio of 2:1 (i.e., 1% of the ester and 0.1% of the protease preparation each based on the meat) was sprinkled. At 1 to 5 minutes thereafter, appropriate amounts of common salt and pepper were sprinkled onto the meat which was then coated successively with wheat flour, liquid egg and bread crumbs and fried in salad oil heated to 180° C. Thus a pork cutlet was prepared.

COMPARATIVE EXAMPLES 9 TO 12

Comparative samples (Comparative Examples 9 to 12) were prepared in the same manner as in Examples 9 to 12 except for using no Ester 1.
(Evaluation)
Each meat dish thus prepared was organoleptically evaluated by 20 panelists. The evaluation was made in the following manner. Namely, the meat dish obtained in each Example was compared with the one of the corresponding Comparative Example in "tenderness". Then the product of the Example was evaluated in 3 grades, i.e., "clearly tenderer (or juicier)", "somewhat tenderer (or juicier)" or "equivocal" in comparison with the one of the Comparative Example. Further, the shear force value of each the meats of the meat dishes of Examples and Comparative Examples was measured with a meat shear (manufactured by WARNER-BRATZLER). A smaller shear force value means a tenderer meat.
Tables 2-1 and 2-2 summarize the results.

TABLE 2-1

|  | Example 9 | Example 10 | Example 11 | Example 12 |
|---|---|---|---|---|
| Clearly tenderer | 15 | 9 | 9 | 15 |
| Somewhat tenderer | 5 | 11 | 11 | 5 |
| Equivocal | 0 | 0 | 0 | 0 |
| Clearly juicier | 16 | 15 | 14 | 14 |
| Relatively juicier | 4 | 5 | 6 | 6 |
| Equivocal | 0 | 0 | 0 | 0 |

TABLE 2-2

| Example No. | 9 | 10 | 11 | 12 |
|---|---|---|---|---|
| Shear force value (kg) | 1.8 | 2.3 | 2.3 | 1.8 |
| Comparative Example No. | 9 | 10 | 11 | 12 |
| Shear force value (kg) | 3.5 | 3.7 | 3.5 | 3.5 |

As the results given in Table 2-1 clearly show, the meat dishes prepared by applying the method of the present invention (Examples 9 to 12) showed each a tender and juicy texture as compared with the corresponding ones prepared without applying the method of the present invention (Comparative Examples 9 to 12). In the case of the meat piece which had been cooked by heating and then stored in a refrigerator (Example 10), further, a tender and juicy meat was obtained by applying the method of the present invention.

EXAMPLE 13

Onto a pork loin slice (100 g) of 1 cm in thickness made in Japan, 1.5 g of a mixture of the ester employed in Example 1 with a preparation of a protease originating from Aspergillus (Sumizyme, manufactured by Shin Nippon Kagaku Kogyo K.K. (enzyme content: 23%)) at a weight ratio of 2:1 (i.e., 1% of the ester and 0.1% of protease preparation each based on the meat) was sprinkled. At 1 to 5 minutes thereafter, appropriate amounts of common salt and pepper were sprinkled onto the meat which was then coated successively with wheat flour, liquid egg and bread crumbs and fried in salad oil heated to 180° C. Thus a pork cutlet was prepared.

EXAMPLE 14

To 350 g of minced beef meat were added 18 g of bread crumbs, 15 g of cow's milk, 35 g of egg, 3.5 g of common salt, 0.35 g of pepper, 0.18 g of nutmeg, 3.5 g of the ester employed in Example 1 (i.e., 1% of the ester based on the meat) and 1.3 g of a preparation of a protease originating from Aspergillus (manufactured by Shin Nippon Kagaku Kogyo K.K. (enzyme content: 23%); i.e., 0.09% of protease based on the meat). After thoroughly kneading, the resulting mixture was molded into hamburger steaks each weighing 40 g. At 1 to 5 minutes thereafter, these hamburger steaks were grilled on a hot plate at 200° C.

REFERENTIAL EXAMPLES 1 AND 2

The procedures of the above Example 13 and Example 14 were repeated except for using no protease to thereby give the corresponding meat dishes (Referential Examples 1 and 2).
(Evaluation)
Each meat dish thus prepared was organoleptically evaluated by 20 panelists. The evaluation was made in the following manner. Namely, the meat dish obtained in each Example was compared with the one of the corresponding Referential Example in "tenderer". Then the product of the Example was evaluated in 3 grades, i.e., "clearly tenderer (or less sinewy)", "somewhat tenderer (or less sinewy)" or "equivocal", in comparison with the one of the corresponding Referential Example. Further, the meat dish of Example 13 was compared with the one of Referential Example 1 in "sinewiness". Namely, the former one was evaluated in 3 grades, i.e., "clearly less sinewy", "relatively less sinewy" or "equivocal", in comparison with the one of Referential Example 1. Also the shear force values of the meats of the meat dishes of Example 13 and Referential Example 1 were measured with a meat shear (manufactured by WARNER-BRATZLER). A smaller shear force value means a tenderer meat.
Tables 3-1 and 3-2 summarize the results.

TABLE 3-1

|  | Example 13 | Example 14 |
|---|---|---|
| Clearly tenderer | 2 | 5 |
| Somewhat tenderer | 11 | 13 |
| Equivocal | 7 | 2 |
| Clearly less sinewy | 6 |  |
| Relatively less sinewy | 11 |  |

TABLE 3-1-continued

|  | Example 13 | Example 14 |
| --- | --- | --- |
| Equivocal | — | 3 |

TABLE 3-2

|  | Example 13 | Referential Example 1 |
| --- | --- | --- |
| Shear force value (kg) | 1.8 | 2.4 |

As the results given in Table 3-1 clearly show, the cutlet prepared by using the protease together with Ester (1) (Example 13) showed each a tender texture and relieved sinewiness as compared with the corresponding one prepared without using protease (Referential Example 1). Also, the shear force value suggests that the meat dish of Example 13 is clearly tenderer as compared with one of Referential Example 1. Further, even in case of hamburg steak, the meat dish prepared by using the protease together with Ester (1) (Example 14) showed a tender texture as compared with the corresponding one prepared without using protease (Referential Example 2).

When the meat dishes were prepared in the same manners as in Examples 13 and 14 except for using no Ester 1, neither sufficient tenderness nor relieved sinewiness was achieved.

The application of the method of the present invention for improving the qualities of meat makes it possible to give a meat having a tender and juicy texture with a relieved sinewiness. In the case of a meat dish with the use of minced meat, further, a fluffiness can be imparted thereby and thus the meat dish can be eaten in an improved state. The method of the present invention is particularly effective in cooking a meat piece of a ceratin size or larger by heating. A meat piece which has been treated by the method of the present invention sustains its tender and good texture even though it gets cold after cooking.

When the method of the present invention for improving the qualities of meat is applied, furthermore, a meat product containing meat pieces which is able to be stored long (for example, frozen food, chilled food) can sustain the above-mentioned texture and deliciousness even after storing.

A meat piece which has been treated by the method of the present invention is scarcely hardened even by heating for a long time. Therefore the heating time and the heating temperature in the cooking procedure can be selected each over an enlarged range.

While the invention has been described in detail and with reference to specific examples thereof, it will be apparent to one skilled in the art that various changes and modifications can be made therein without departing from the spirit and scope thereof.

What is claimed is:

1. A method for improving the qualities of meat which comprises treating a meat piece with an ester represented by the following formula (1):

$$\begin{array}{c} CH_2OR^1 \\ | \\ CHOH \\ | \\ CH_2OR^2 \end{array} \quad (1)$$

wherein one of $R^1$ and $R^2$ represents a saturated or unsaturated monocarboxylic acid residue having 2 to 24 carbon atoms while the other represents a dicarboxylic acid residue.

2. The method of claim 1, wherein said monocarboxylic acid residue is selected from hydroxymonocarboxylic acids, saturated fatty acids and unsaturated fatty acids.

3. The method of claim 1, wherein said monocarboxylic acid residue is selected from gluconic acid, lactic acid, acetic acid, propionic acid, butyric acid, valeric acid, hexanoic acid, octanoic acid, decanoic acid, lauric acid, myristic acid, palmitic acid, stearic acid, arachidic acid, behenic acid, palmitoleic acid, oleic acid, elaidic acid, linoleic acid, linolenic acid and erucic acid.

4. The method of claim 1, wherein said monocarboxylic acid residue is selected from gluconic acid, lactic acid, stearic acid and oleic acid.

5. The method of claim 1, wherein said dicarboxylic acid residue is selected from among residues of saturated dicarboxylic acids, unsaturated dicarboxylic acids, hydroxydicarboxylic acids and hydroxydicarboxylic acids wherein some or all of hydroxyl groups thereof have been esterified with a carboxylic acid selected from monocarboxylic acids having from 2 to 24 carbon atoms, said saturated dicarboxylic acids, said unsaturated hydroxycarboxylic acids and said hydroxydicarboxylic acids.

6. The method of claim 1, wherein said dicarboxylic acid residue is one selected from the residues of oxalic acid, malonic acid, succinic acid, glutaric acid, adipic acid, pimelic acid, suberic acid, azelaic acid, maleic acid, methylmaleic acid, fumaric acid, methylfumaric acid, malic acid, tartaric acid, and malic acid and tartaric acid wherein the hydroxyl group thereof has been esterified with one of said dicarboxylic acids and monocarboxylic acids having from 2 to 24 carbon atoms.

7. The method of claim 1, wherein said dicarboxylic acid residue is one selected from the residues of succinic acid, malic acid and diacetyltartaric acid.

8. The method of claim 1, wherein said ester of formula (1) is used in an amount of from 0.05 to 5% by weight based on the meat piece.

9. The method of claim 1, wherein a protease is further used.

10. The method of claim 9, wherein said protease is used in an amount of from 0.001 to 5% by weight based on a meat piece.

11. A meat piece which has been treated with an ester represented by the following formula (1):

$$\begin{array}{c} CH_2OR^1 \\ | \\ CHOH \\ | \\ CH_2OR^2 \end{array} \quad (1)$$

wherein one of $R^1$ and $R^2$ represents a saturated or unsaturated monocarboxylic acid residue having 2 to 24 carbon atoms while the other represents a dicarboxylic acid residue.

12. The meat piece of claim 11, wherein said monocarboxylic acid residue is selected from hydroxymonocarboxylic acids, saturated fatty acids and unsaturated fatty acids.

13. The meat piece of claim 11, wherein said monocarboxylic acid residue is selected from gluconic acid, lactic acid, acetic acid, propionic acid, butyric acid, valeric acid, hexanoic acid, octanoic acid, decanoic acid, lauric acid, myristic acid, palmitic acid, stearic acid, arachidic acid, behenic acid, palmitoleic acid, oleic acid, elaidic acid, linoleic acid, linolenic acid and erucic acid.

14. The meat piece of claim 11, wherein said monocarboxylic acid residue is selected from gluconic acid, lactic acid, stearic acid and oleic acid.

15. The meat piece of claim 11, wherein said dicarboxylic acid residue is selected from among residues of saturated dicarboxylic acids, unsaturated dicarboxylic acids, hydroxydicarboxylic acids and hydroxydicarboxylic acids wherein some or all of hydroxyl groups thereof have been esterified with a carboxylic acid selected from monocarboxylic acids having from 2 to 24 carbon atoms, said saturated dicarboxylic acids, said unsaturated hydroxycarboxylic acids and said hydroxydicarboxylic acids.

16. The meat piece of claim 11, wherein said dicarboxylic acid residue is one selected from the residues of oxalic acid, malonic acid, succinic acid, glutaric acid, adipic acid, pimelic acid, suberic acid, azelaic acid, maleic acid, methylmaleic acid, fumaric acid, methylfumaric acid, malic acid, tartaric acid, and malic acid and tartaric acid wherein the hydroxyl group thereof has been esterified with one of said dicarboxylic acids and monocarboxylic acids having from 2 to 24 carbon atoms.

17. The meat piece of claim 11, wherein said dicarboxylic acid residue is one selected from the residues of succinic acid, malic acid and diacetyltartaric acid.

18. The meat piece of claim 11, wherein said ester of formula (1) is used in an amount of from 0.05 to 5% by weight based on the meat piece.

19. The meat piece of claim 11, wherein a protease is further used.

20. The meat piece of claim 19, wherein said protease is used in an amount of from 0.001 to 5% by weight based on the meat piece.

21. An agent for improving the qualities of meat which comprises an ester represented by the following formula (1) and a protease:

$$\begin{array}{r}CH_2OR^1 \\ | \\ CHOH \\ | \\ CH_2OR^2\end{array} \quad (1)$$

wherein one of $R^1$ and $R^2$ represents a saturated or unsaturated monocarboxylic acid residue having 2 to 24 carbon atoms while the other represents a dicarboxylic acid residue.

22. The agent of claim 21, wherein a weight ratio of said protease to said ester ranges from 10:1 to 1:10.

* * * * *